(12) United States Patent
Okayama

(10) Patent No.: US 7,835,606 B2
(45) Date of Patent: Nov. 16, 2010

(54) OPTICAL MULTIPLEXING/DEMULTIPLEXING DEVICE

(75) Inventor: Hideaki Okayama, Minato-ku (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 188 days.

(21) Appl. No.: 12/289,870

(22) Filed: Nov. 6, 2008

(65) Prior Publication Data
US 2009/0202247 A1    Aug. 13, 2009

(30) Foreign Application Priority Data
Feb. 8, 2008    (JP)    ............................. 2008-029365
Jun. 30, 2008    (JP)    ............................. 2008-170095

(51) Int. Cl.
*G02B 6/26*    (2006.01)
*G02B 6/42*    (2006.01)

(52) U.S. Cl. .......................................... 385/39; 385/27

(58) Field of Classification Search ........................ None
See application file for complete search history.

(56) References Cited

U.S. PATENT DOCUMENTS 7,027,686 B1 *    4/2006    Wang et al. .................... 385/27

FOREIGN PATENT DOCUMENTS

JP    A 8-163028    6/1996

\* cited by examiner

*Primary Examiner*—Uyen-Chau N Le
*Assistant Examiner*—Chad H Smith
(74) *Attorney, Agent, or Firm*—Solaris Intellectual Property Group, PLLC

(57) ABSTRACT

In an optical multiplexing/demultiplexing device are arranged in parallel and disposed on a substrate. The optical multiplexing/demultiplexing device is disposed with three or more Mach-Zehnder interferometers between the first and second optical input/output ports. The optical multiplexing/demultiplexing device divides, by wavelength, multiplexed light comprising first light and second light whose wavelengths are different and which are input to one of the first optical input/output ports and outputs the multiplexed light from each of the second optical input/output ports. The absolute value of an optical path difference $\Delta L$ of each the Mach-Zehnder interferometers is constant. The optical multiplexing/demultiplexing device includes one or more each of a pair of two successive Mach-Zehnder interferometers where the sum of their optical path differences becomes $+2\Delta L$ or $-2\Delta L$ and a pair of two successive Mach-Zehnder interferometers where the sum of their optical path differences becomes 0.

10 Claims, 11 Drawing Sheets

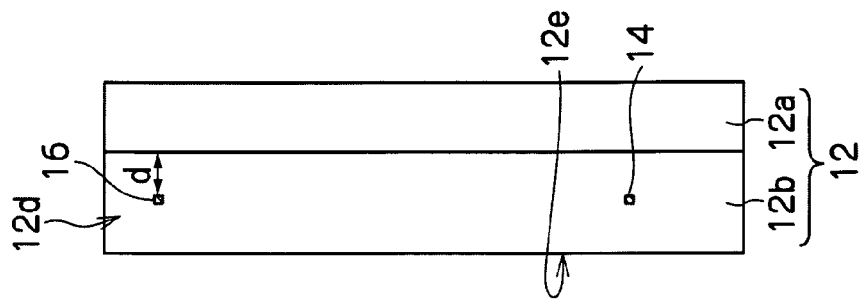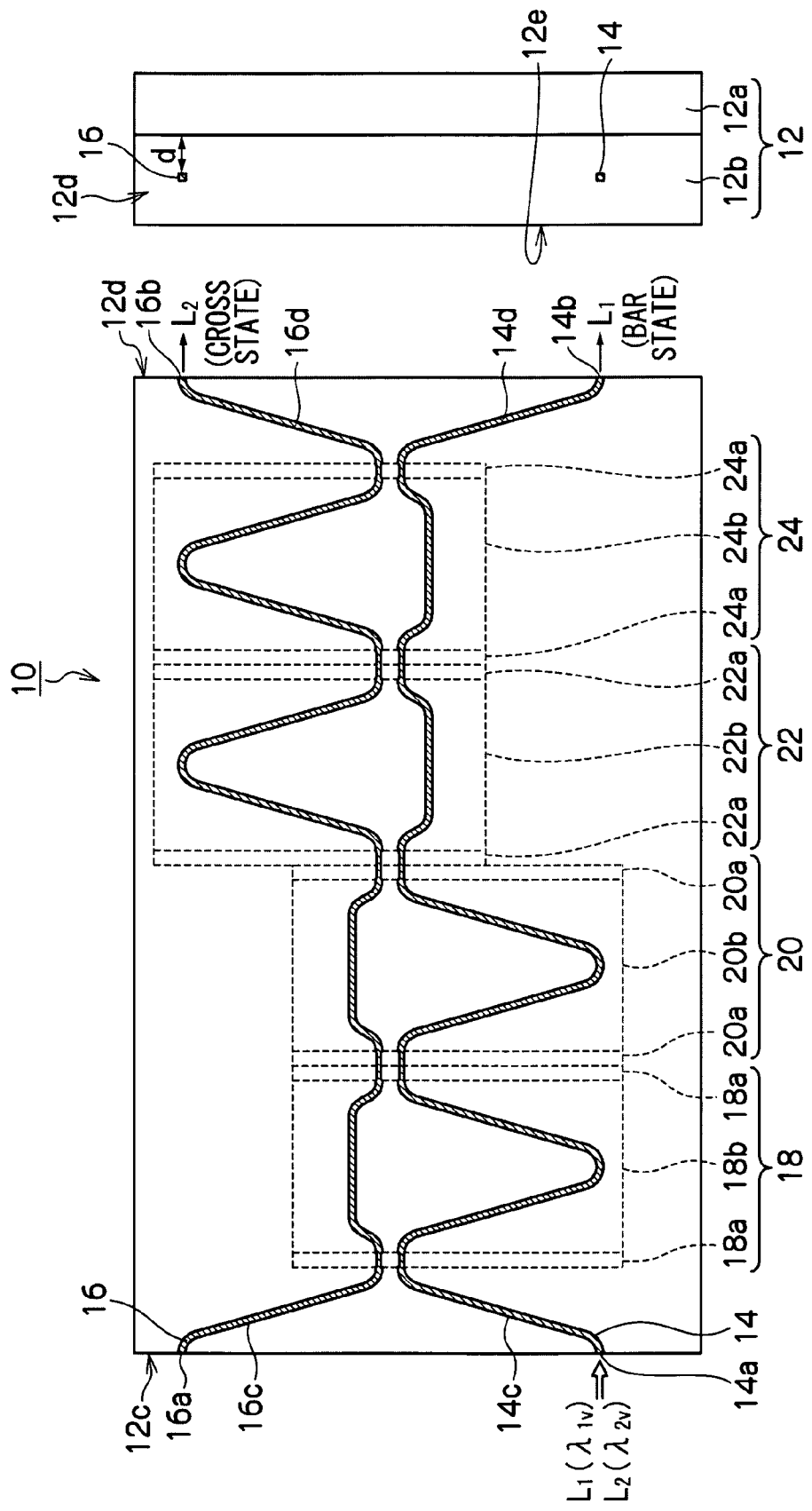

FIG. 8A
FIG. 8B
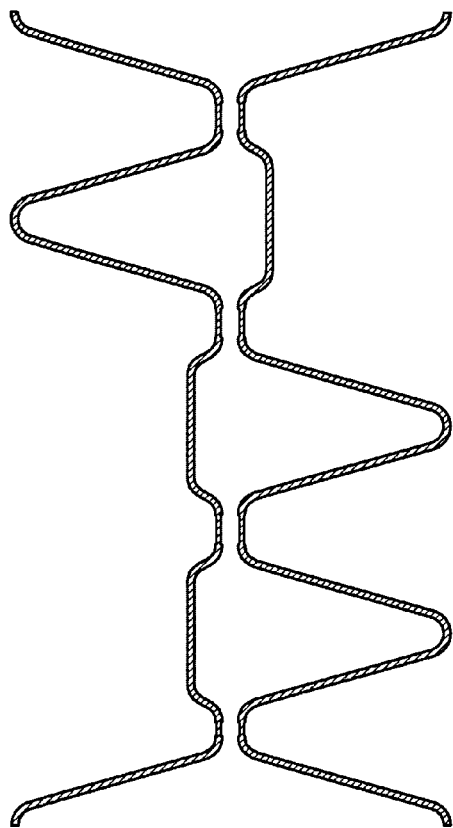
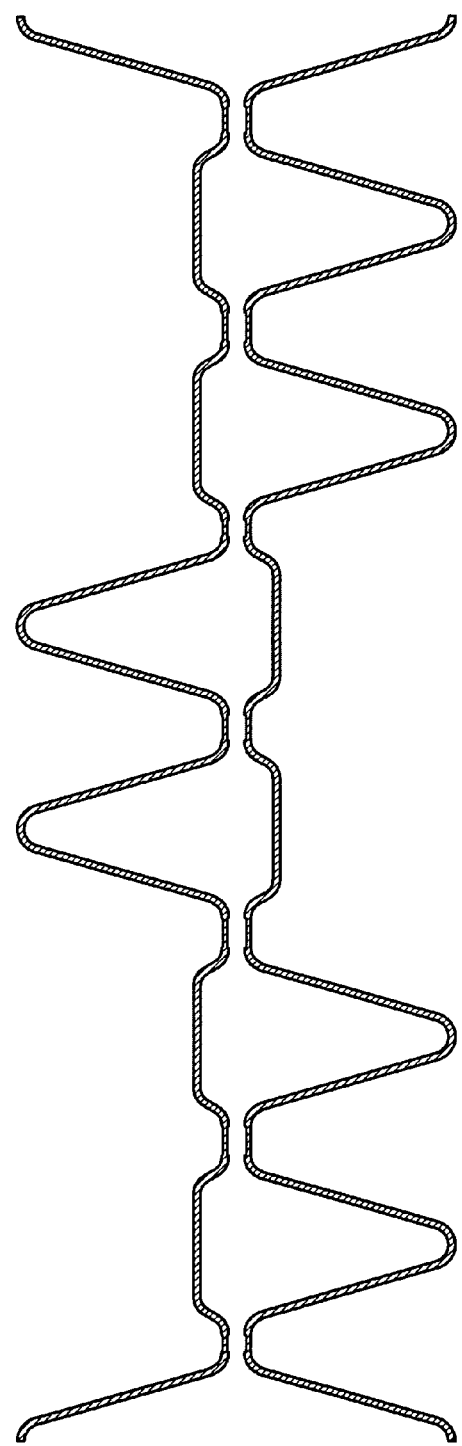

OPTICAL MULTIPLEXING/DEMULTIPLEXING DEVICE

CROSS-REFERENCE TO RELATED APPLICATION

This application claims priority under 35 USC 119 from Japanese Patent Application Nos. 2008-029365 and 2008-170095, the disclosures of which are incorporated by reference herein.

BACKGROUND OF THE INVENTION

1. Field of the Invention

This invention relates to an optical multiplexing/demultiplexing device that performs multiplexing and demultiplexing of optical signals.

2. Description of the Related Art

In an optical subscriber loop system, it is necessary to perform, by a single optical fiber, optical transmission from a subscriber to a station, that is, uplink transmission, and optical transmission from the station to the subscriber, that is, downlink transmission. For that reason, between uplink transmission and downlink transmission, lights of different wavelengths are used. Consequently, an optical multiplexing/demultiplexing device that multiplexes/demultiplexes these lights of different wavelengths becomes necessary.

The optical multiplexing/demultiplexing device that is used on the subscriber side is called an optical network unit (ONU). Many ONUs that are presently used are configured from a wavelength filter, a photodiode and a laser diode whose optical axes are spatially optically combined. Further, an ONU that renders optical axis combination unnecessary by using optical waveguides is also known (e.g., see Japanese Patent Application Laid-Open (JP-A) No. 8-163028).

Further, in recent years, an ONU that uses, as a waveguide material, Si, which has excellent mass productivity, has garnered attention. As this type of ONU, an ONU that uses a Mach-Zehnder interferometer, an ONU that uses a directional coupler, and an ONU that uses a grating are known.

However, a Si-made ONU that uses a directional coupler is susceptible to wavelength shifts of the light source. Further, the device becomes a size of the order of several hundreds of μm, so it is difficult to make the device compact.

Further, in a Si-made ONU that uses a grating, it is necessary for the period of the grating to be equal to or less than half the wavelength, so it is difficult to fabricate the device.

Moreover, in a Si-made ONU that uses a Mach-Zehnder interferometer, wavelength dependence, such as the equivalent refractive index and the coupling coefficient of the directional coupler, is extremely large, so in the wavelength range that is used by the ONU, crosstalk arises and light intensity drops, so desired characteristics have been unable to be obtained.

SUMMARY OF THE INVENTION

This invention has been made in view of the aforementioned problems. Consequently, it is an object of this invention to provide an optical multiplexing/demultiplexing device that reduces crosstalk in the wavelength range that is used by an ONU, controls intensity loss more than convention, and uses Mach-Zehnder interferometers that are capable of being made compact.

The inventors of this invention arrived at being able to achieve the aforementioned object by arranging in series three or more Mach-Zehnder interferometers whose optical path difference $\Delta L$ is constant and by arranging the Mach-Zehnder interferometers such that there are one or more each of a pair where the sum of the optical path differences of a pair of two successive Mach-Zehnder interferometers becomes 0 and a pair where the sum of the optical path differences of a pair of two successive Mach-Zehnder interferometers becomes $+2 \Delta L$ or $-2 \Delta L$. That is, this invention has the following technical characteristics.

In an optical multiplexing/demultiplexing device of this invention, first and second optical waveguides, one end of each of which is configured as a first optical input/output port and the other end of each of which is configured as a second optical input/output port, are arranged in parallel and disposed on a substrate, and the optical multiplexing/demultiplexing device is disposed in series with three or more Mach-Zehnder interferometers that are formed by the first and second optical waveguides between the first and second optical input/output ports of the first and second optical waveguides.

Additionally, the optical multiplexing/demultiplexing device separates, by wavelength, multiplexed light comprising first light and second light whose wavelengths are different and which are input to one of the first optical input/output ports and outputs the multiplexed light from each of the second optical input/output ports.

In this optical multiplexing/demultiplexing device, the absolute value of an optical path difference $\Delta L$ with respect to light that propagates through the first and second optical waveguides in each of the Mach-Zehnder interferometers is constant.

Moreover, the optical multiplexing/demultiplexing device includes one or more each of a pair of two successive Mach-Zehnder interferometers where the sum of their optical path differences becomes $+2 \Delta L$ or $-2 \Delta L$ and a pair of successive Mach-Zehnder interferometers where the sum of optical path differences of the interferometers becomes 0.

By setting the optical path difference $\Delta L$ of each of the Mach-Zehnder interferometers to a predetermined value using the wavelengths of the first light and the second light, the multiplexed light comprising the first light and the second light that are input to either one of the first optical input/output ports can be separated by wavelength and inputted/outputted from each of the second optical input/output ports.

Specifically, for example, when the multiplexed light comprising the first light and the second light is input to the optical multiplexing/demultiplexing device from one of the first optical input/output ports, the first light is outputted from one of the second optical input/output ports and the second light is outputted from the other of the second optical input/output ports.

Incidentally, in the first light and the second light, a reverse process is also similarly satisfied, so, for example, the first light that has been input to the optical multiplexing/demultiplexing device from one of the second optical input/output ports travels along the reverse path from what has been described above, is multiplexed with the second light, and is outputted from one of the first optical input/output ports.

That is, when the first light is an uplink signal from a subscriber to a station and the second light is a downlink signal from the station to the subscriber, this optical multiplexing/demultiplexing device can be caused to function as an ONU.

Further, when the optical path difference $\Delta L$ in one of the Mach-Zehnder interferometers is defined as (optical path length of first optical waveguide—optical path length of second optical waveguide), two types of values that are ΔL and −ΔL are calculated as the optical path difference.

Consequently, when a pair of two adjacent (successive) Mach-Zehnder interferometers is considered, three types of values that are 2 ΔL, 0 and −2 ΔL are calculated.

This optical multiplexing/demultiplexing device, is disposed with one or more of a pair of Mach-Zehnder interferometers where the sum of their optical path differences becomes 2 ΔL or −2 ΔL and is disposed with one or more of a pair of Mach-Zehnder interferometers where the sum of their optical path differences becomes 0.

By configuring the optical multiplexing/demultiplexing device in this manner, the wavelength band of light (second light) that is inputted/outputted in a cross state to/from the Mach-Zehnder interferometers and the wavelength band of light (first light) that is inputted/outputted in a bar state can be broadened.

In this optical multiplexing/demultiplexing device, when $\lambda_1$ and $\lambda_2$ ($\lambda_2 > \lambda_1$) respectively represent the wavelengths of the first light and the second light inside the first and second optical waveguides, it is preferred that ΔL is given by the following expressions.

$$\Delta L = (2m+1) \times \lambda_1 \text{ and } \Delta L = 2m \times \lambda_2 \text{ (where m is a natural number)} \quad (1)$$

By configuring the optical multiplexing/demultiplexing device in this manner, the first light of wavelength $\lambda_1$ propagates through the optical multiplexing/demultiplexing device in a bar state. Further, the second light of wavelength $\lambda_2$ ($\lambda_2 > \lambda_1$) propagates through the optical multiplexing/demultiplexing device in a cross state. As a result, the optical multiplexing/demultiplexing device can separate the wavelengths of the first light and the second light.

In this optical multiplexing/demultiplexing device, it is preferred that the first light is outputted in a bar state from one of the second optical input/output ports and that the second light is outputted in a cross state from the other of the second optical input/output ports.

In this optical multiplexing/demultiplexing device, it is preferred that first and second optical waveguides are formed using Si as a material.

By configuring the optical multiplexing/demultiplexing device in this manner, the optical multiplexing/demultiplexing device can be manufactured easily utilizing a Si semiconductor device manufacturing process.

In this optical multiplexing/demultiplexing device, it is preferred that cross-sectional shapes, orthogonal to the light propagation direction, of the first and second optical waveguides that configure bend waveguide sections of the Mach-Zehnder interferometers are square, and that cross-sectional shapes, orthogonal to the light propagation direction, of the first and second optical waveguides that configure directional coupler sections of the Mach-Zehnder interferometers are rectangular where the length in a direction perpendicular to a main surface of the substrate is longer than the length in a direction parallel to the main surface of the substrate.

By configuring the optical multiplexing/demultiplexing device in this manner, it can be ensured that the optical multiplexing/demultiplexing device is not dependent on polarization.

In this optical multiplexing/demultiplexing device, it is preferred that the bend waveguide sections are formed by a straight waveguide and by a plurality of curve waveguides whose radii of curvature are equal.

By configuring the optical multiplexing/demultiplexing device in this manner, loss of the first light and the second light in the optical multiplexing/demultiplexing device can be reduced even more.

In the aforementioned optical multiplexing/demultiplexing device, it is preferred that the optical path difference ΔL is determined utilizing the wavelength dependence of the equivalent refractive index of the material that configures the first and second optical waveguides.

In the aforementioned optical multiplexing/demultiplexing device, it is preferred that the material that configures the first and second optical waveguides is Si.

In the aforementioned optical multiplexing/demultiplexing device, it is preferred that, when Δλ represents the wavelength difference between the first light and the second light, Δn represents the equivalent refractive index difference between the first and second optical waveguides that the first light and the second light experience, and m is a positive integer, the following expression (15) is satisfied and the optical path difference ΔL satisfies the following expression (16).

$$\Delta n / n_2 = (1 - \Delta \lambda / \lambda_2)/(2m) - \Delta \lambda / \lambda_2 \quad (15)$$

$$2 n_2 \Delta L / \lambda_2 = (1 - \Delta \lambda / \lambda_2)/(\Delta \lambda / \lambda_2 + \Delta n / n_2) \quad (16)$$

Here, $n_2$ is the equivalent refractive index of an optical waveguide that the second light experiences.

In another optical multiplexing/demultiplexing device pertaining to this invention, first and second optical waveguides, one end of each of which is configured as a first optical input/output port and the other end of each of which is configured as a second optical input/output port, are arranged in parallel and disposed on a substrate, and the optical multiplexing/demultiplexing device is disposed in series with three or more Mach-Zehnder interferometers that are formed by the first and second optical waveguides between the first and second optical input/output ports of the first and second optical waveguides.

Additionally, the optical multiplexing/demultiplexing device separates, by wavelength, multiplexed light of N wavelengths (where N is an integer such that N≧3) whose wavelengths are different and which are input to either one of the first optical input/output ports, outputs light of (N−i) wavelength (where i is an integer such that 1≦i≦N−1) from the second optical input/output port of the first optical waveguide, and outputs light of i wavelength is outputted from the second optical input/output port of the second optical waveguide.

Here, when m is an integer equal to or greater than 1, the absolute value of an optical path difference ΔL with respect to light that propagates through the first and second optical waveguides in each of the Mach-Zehnder interferometers is constant Moreover, the optical multiplexing/demultiplexing device includes one or more each of a pair of two successive Mach-Zehnder interferometers where the sum of their optical path differences becomes +2 ΔL or −2 ΔL and a pair of two successive Mach-Zehnder interferometers where the sum of their optical path differences becomes 0.

Further still, the following expression (15)' and expression (16)' are simultaneously satisfied.

$$\Delta n / n_a = \Delta m (-\Delta \lambda / \lambda_a)/(2m) - \Delta \lambda / \lambda_a \quad (15)'$$

$$2 n_a \Delta L / \lambda_a = 2m = \Delta m (1 - \Delta \lambda / \lambda_a)/(\Delta \lambda / \lambda_a + \Delta n / n_a) \quad (16)'$$

Δm is an integer that is given by 2–N, $\lambda_a$ is a reference wavelength, and $n_a$ is the equivalent refractive index of an optical waveguide that light of the reference wavelength experiences.

This invention has the aforementioned technical characteristics. Thus, there is obtained an optical multiplexing/demultiplexing device that reduces crosstalk in the wavelength range that is used by an ONU, controls intensity loss more than convention, and uses Mach-Zehnder interferometers that are capable of being made compact.

BRIEF DESCRIPTION OF THE DRAWINGS

A preferred exemplary embodiment of the present invention will be described in detail based on the following figures, wherein:

FIG. 1A is a plan diagram of an optical multiplexing/demultiplexing device of this exemplary embodiment;

FIG. 1B is a side diagram of the optical multiplexing/demultiplexing device of this exemplary embodiment;

FIG. 8A is a diagram showing a modification of the optical multiplexing/demultiplexing device;

FIG. 8B is a diagram showing a modification of the optical multiplexing/demultiplexing device;

DETAILED DESCRIPTION OF THE INVENTION

Figure 2A:
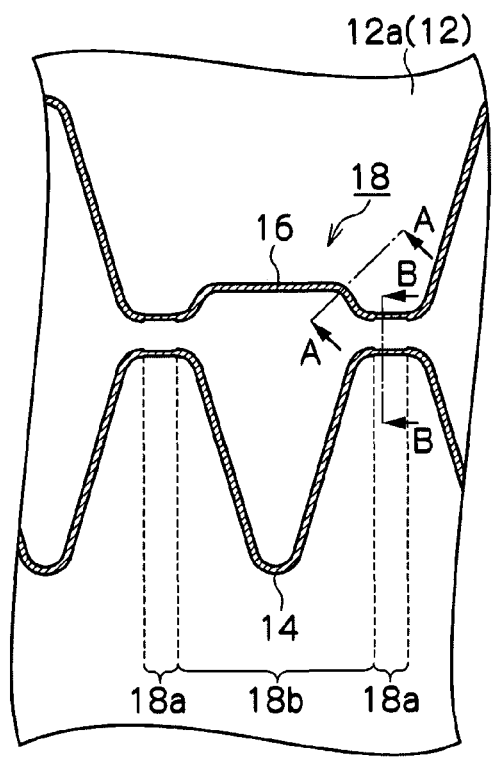
FIG. 2A is a plan diagram of a Mach-Zehnder interferometer.

Below, an exemplary embodiment of this invention will be described. It will be noted that each drawing only generally shows the shape, size and the arrangement relationship of each component to the extent that this invention can be understood. Further, below, a preferred configural example of this invention will be described, but the material and numerical condition of each component are simply preferred examples. Consequently, this invention is not limited in any way to the exemplary embodiment below. Further, in each of the drawings, identical reference numerals are given to common components, and sometimes description thereof will be omitted.

(Structure)

The structure of an optical multiplexing/demultiplexing device 10 of this exemplary embodiment will be described with reference to FIG. 1A to FIG. 9. FIG. 1A is a plan diagram of the optical multiplexing/demultiplexing device 10. FIG. 1B is a side diagram of the optical multiplexing/demultiplexing device 10. It will be noted that, in FIG. 1A and FIG. 1B, diagonal lines are administered to regions that represent first and second optical waveguides 14 and 16 taking in consideration of the ease of understanding the drawings.

Referring to FIG. 1A, the optical multiplexing/demultiplexing device 10 is formed by a substrate 12 and first and second optical waveguides 14 and 16. The substrate 12 is configured in a rectangular parallelepiped shape, for example, from a bottom layer 12a whose material is single crystal silicon and a top layer 12b that serves as a clad whose material is a silicon oxide film. Additionally, in the top layer 12b, the first optical waveguide 14 and the second optical waveguide 16 that serve as cores whose material is single crystal silicon are arranged in parallel and disposed.

The first and second optical waveguides 14 and 16 are disposed in positions where their depths measured in a thickness direction from a flat first main surface 12e of the substrate 12 are equal. Further, a distance d between the bottom layer 12a and the first and second optical waveguides 14 and 16 is ordinarily configured to be equal to or greater than 1 μm in order to prevent light leakage to the bottom layer 12a.

The first optical waveguide 14 is disposed with a first optical input/output port 14a in one side surface 12c of the substrate 12. The first optical waveguide 14 is also disposed with a second optical input/output port 14b in another side surface 12d of the substrate 12.

Similarly, the second optical waveguide 16 is disposed with a first optical input/output port 16a in the one side surface 12c of the substrate 12. The second optical waveguide 16 is also disposed with a second optical input/output port 16b in the other side surface 12d of the substrate 12.

In this exemplary embodiment, as one example, between the first optical input/output ports 14a and 16a and the second optical input/output ports 14b and 16b, four Mach-Zehnder interferometers 18, 20, 22 and 24 that are formed by the first and second optical waveguides 14 and 16 are formed in series.

The details of the Mach-Zehnder interferometers 18 to 24 will be described later with reference to FIG. 2A, but the Mach-Zehnder interferometers 18 to 24 are arranged in the order of 18, 20, 22 and 24 from the side of the first optical input/output ports 14a and 16a toward the second optical input/output ports 14b and 16b.

Additionally, the Mach-Zehnder interferometer 18 and the first optical input/output ports 14a and 16a are interconnected by connection-use optical waveguides 14c and 16c. Similarly, the Mach-Zehnder interferometer 24 and the second optical input/output ports 14b and 16b are interconnected by connection-use optical waveguides 14d and 16d.

The structures of the Mach-Zehnder interferometers 18 to 24 are the same except with regard to which of the first optical waveguide 14 and second optical waveguide 16 is longer in later-described bend waveguide sections 18b to 24b.

In the example shown in FIG. 1A, in the Mach-Zehnder interferometers 18 and 20, the optical path length of the first optical waveguide 14 is formed longer than the optical path length of the second optical waveguide 16, and in the Mach-Zehnder interferometers 22 and 24, the optical path length of the second optical waveguide 16 is formed longer than the optical path length of the first optical waveguide 14. The first and second optical waveguides 14 and 16 respectively include straight waveguide regions that form directional couplers along a straight direction from the first optical input/output ports 14a and 16a to the second optical input/output ports 14b and 16b. Moreover, ending point positions in the straight direction from the straight waveguide regions on the front side of the first and second optical waveguides 14 and 16 to bend waveguide regions are the same positions. Further, straight direction starting point positions from the bend waveguide regions of the first and second optical waveguides 14 and 16 to the straight waveguide regions on the rear side are the same positions. Consequently, in relation to each of the Mach-Zehnder interferometers 18 to 24, ΔL represents an optical path difference between the first and second optical waveguides 14 and 16 in the bend waveguide sections 18b to 24b, that is, "(optical path length of first optical waveguide 14)−(optical path length of second optical waveguide 16)". In this case, the absolute value of ΔL is constant regardless of the Mach-Zehnder interferometers 18 to 24. That is, in the bend waveguide sections 18b to 24b, the optical path differences between the first optical waveguide 14 and the second optical waveguide 16 are equal regarding all of the Mach-Zehnder interferometers 18 to 24. It will be noted that all of the regions of the bend waveguide sections 18b to 24b may be formed by bend regions, or they may be partially partitioned into bend regions and straight regions and formed. How the bend waveguide sections 18b to 24b are to be configured is a design problem.

Further, this optical multiplexing/demultiplexing device 10 is disposed with one or more each of a pair of two successive Mach-Zehnder interferometers where the sum of their optical path differences becomes +2 ΔL or −2 ΔL and a pair of two successive Mach-Zehnder interferometers where the sum of their optical path differences becomes 0. In the example shown in FIG. 1A, the former pair is the Mach-Zehnder interferometers 18 and 20 and 22 and 24, and the latter pair is the Mach-Zehnder interferometers 20 and 22.

The sum of the optical path differences in the pairs (18 and 20, 20 and 22, 22 and 24) of two successive Mach-Zehnder interferometers is determined. Thus, in pair 18 and 20, the sum of the optical path differences becomes 2 ΔL (=ΔL+ΔL). In pair 20 and 22, the sum of the optical path differences becomes 0 (=ΔL+(−ΔL)). Further, in pair 22 and 24, the sum of the optical path differences becomes −2 ΔL (=(−ΔL)+(−ΔL)). In other words, this optical multiplexing/demultiplexing device 10 is disposed with two pairs (18 and 20, 22 and 24) of Mach-Zehnder interferometers where the sum of their optical path differences becomes +2 ΔL or −2 ΔL and is disposed with one pair (20 and 22) of Mach-Zehnder interferometers where the sum of their optical path differences becomes 0.

The reason why the optical multiplexing/demultiplexing device 10 is disposed with one of more each of a pair of two successive Mach-Zehnder interferometers where the sum of their optical path differences becomes +2 ΔL or −2 ΔL (below, also called a "bar state pair") and a pair of two successive Mach-Zehnder interferometers where the sum of their optical path differences becomes 0 (below, also called a "cross state pair") will be described below with reference to FIG. 7.

The inventors performed a simulation where the total number of pairs of the bar state pair and the cross state pair was made constant and where the number of the bar state pair was increased and reduced. As a result, it became apparent that the more the number of the bar state pair increases, the more the wavelength band of the bar state, in other words, a width Wb of a flat portion of a peak of curve 1 in FIG. 7, becomes wider.

Figure 7:
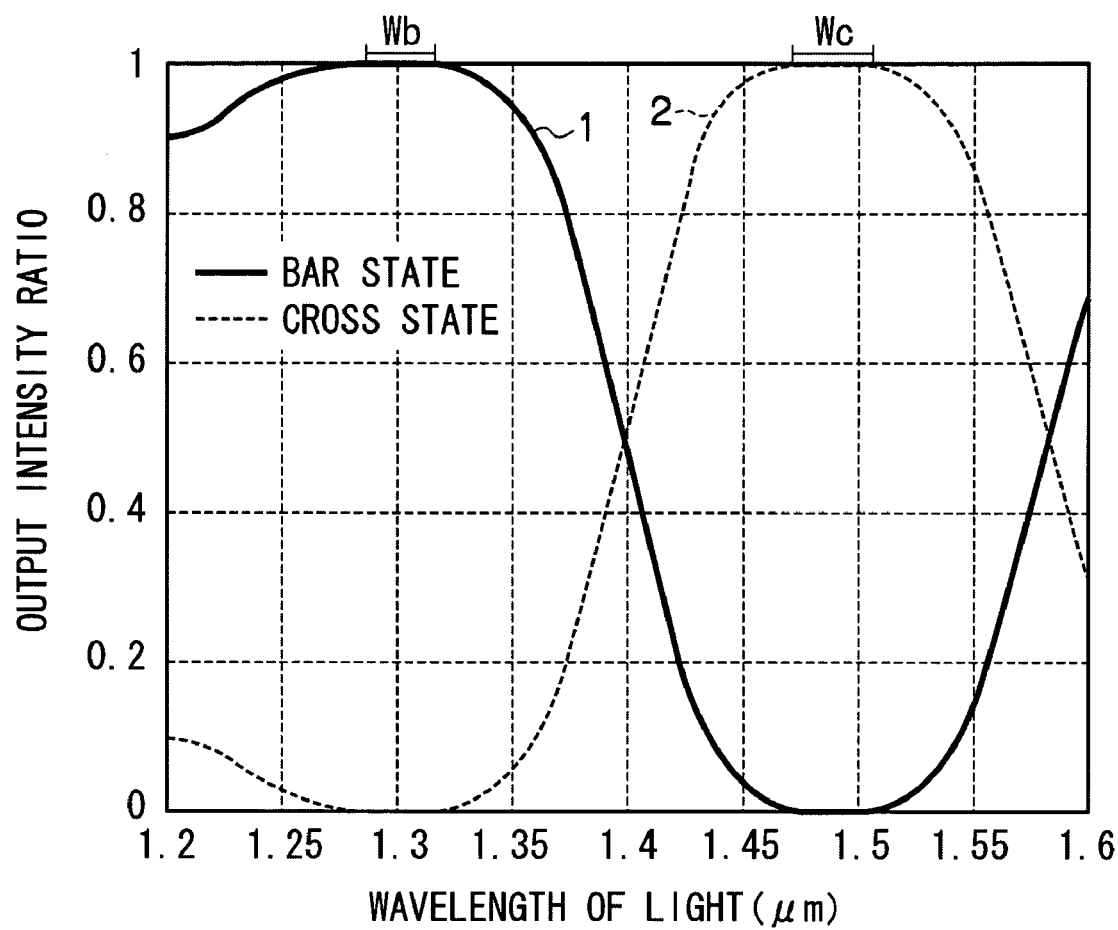
FIG. 7 is a diagram provided for describing operating characteristics of the optical multiplexing/demultiplexing device of this exemplary embodiment.

It also became apparent that the more the number of the cross state pair increases, the more the wavelength band of the cross state, in other words, a width of a flat portion Wc of a peak of curve 2 in FIG. 7, becomes wider.

Because of these facts, the wavelength bands of the bar state and the cross state can be broadened to an extent that can be practically allowed as a result of the optical multiplexing/demultiplexing device 10 being disposed with at least one or more each of the bar state pair and the cross state pair.

(Structure of the Mach-Zehnder Interferometers)

Next, referring to FIG. 2A to FIG. 2C, the structure of the Mach-Zehnder interferometers will be described in detail using the Mach-Zehnder interferometer 18 as an example. FIG. 2A is a plan diagram showing the waveguide structure of the Mach-Zehnder interferometer 18 excluding the top layer 12b of the substrate 12. FIG. 2B is a cut end surface diagram of a cut surface along line A-A of FIG. 2A. FIG. 2C is a cut end surface diagram of a cut surface along line B-B of FIG. 2A.

Figure 2B:
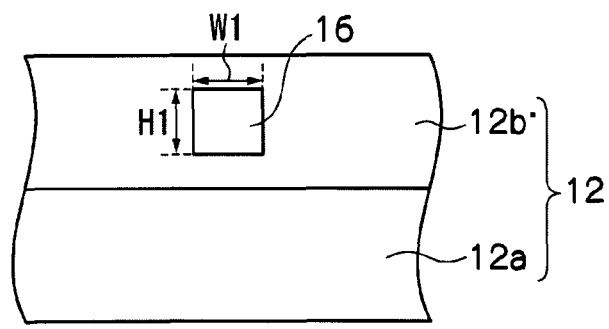
FIG. 2B is a cut end surface diagram of a cut surface along line A-A of FIG. 2A.
Figure 2C:
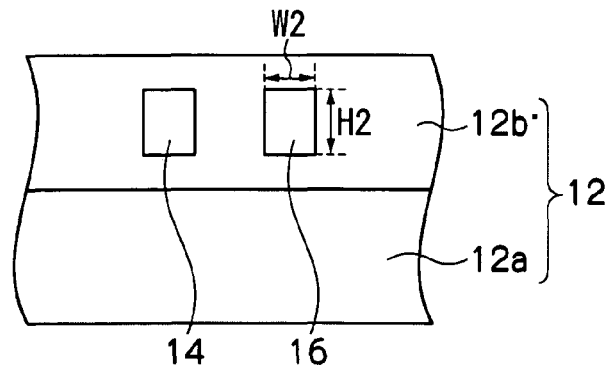
FIG. 2C is a cut end surface diagram of a cut surface along line B-B of FIG. 2A.

Referring to FIG. 2A, the Mach-Zehnder interferometer 18 is disposed with directional coupler sections 18a and 18a and the bend waveguide section 18b.

The directional coupler sections 18a and 18a of the first and second optical waveguides 14 and 16 are sections that combine to form directional couplers, and these sections 18a and 18a are sections where the first and second optical waveguides 14 and 16 are arranged in parallel at a gap capable of optical coupling.

The bend waveguide section 18b is a region between the directional coupler sections 18a and 18a and, as has already been described, is formed by combining a bend region where the first and second optical waveguides 14 and 16 of different lengths are curved into a predetermined shape and straight regions. In the Mach-Zehnder interferometers 18 and 20, the optical path length of the first optical waveguide 14 is formed longer than the optical path length of the second optical waveguide 16 (see FIG. 1A).

It will be noted that the optical path difference ΔL between the first and second optical waveguides 14 and 16 in the bend waveguide section 18b and a design of the bend waveguide section 18b that achieves ΔL will be described later.

Further, referring to FIG. 2B and FIG. 2C, it will be understood that, in the directional coupler sections 18a and the bend waveguide section 18b, the heights of the first and second optical waveguides 14 and 16, that is, their lengths at a right angle to the light propagation direction and perpendicular to the main surface 12e of the substrate 12, are equal, but the widths of the first and second optical waveguides 14 and 16, that is, their lengths at a right angle to the light propagation direction and parallel to the main surface 12e of the substrate 12, are different.

Further, in the bend waveguide section 18b, transverse cross-sectional shapes of the first and second optical waveguides 14 and 16 that are obtained by cutting in a plane perpendicular to the light propagation direction are square (see FIG. 2B). In other words, a width W1 and a height H1 are equal.

In contrast, in the directional coupler sections 18a, transverse cross-sectional shapes of the first and second optical waveguides 14 and 16 are rectangular where the width is narrower than in the bend waveguide section 18b, so the height H1 is larger than a width W2.

Consequently, at the boundary portions between the bend waveguide section 18b and the directional coupler sections 18a, the widths of the first and second optical waveguides 14 and 16 change discontinuously.

It will be noted that the difference in the widths of the optical waveguides in the directional coupler sections 18a and the bend waveguide section 18b will be described later.

(Regarding ΔL)

Next, the optical path difference ΔL between the first and second optical waveguides 14 and 16 in the bend waveguide sections 18b to 24b of the Mach-Zehnder interferometers 18 to 24 will be described.

ΔL is determined in consideration of the wavelength of light that the optical multiplexing/demultiplexing device 10 is to multiplex/demultiplex. Usually, in a Mach-Zehnder interferometer, the optical path difference in the bend waveguide section is appropriately set with respect to the wavelength of light that has been input, whereby the input light can be outputted in either a bar state or a cross state.

Figure 3:
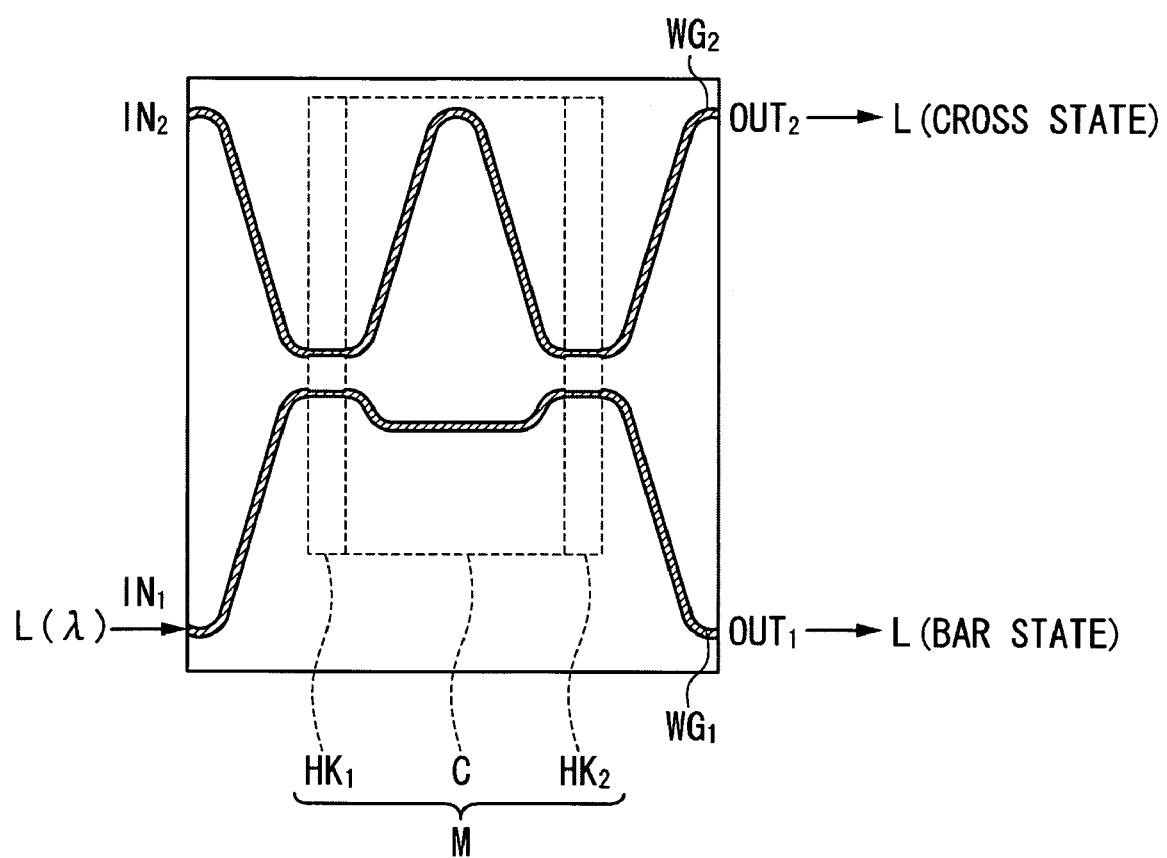
FIG. 3 is a plan diagram schematically showing the structure of a Mach-Zehnder interferometer.

The bar state and the cross state will be more specifically described with reference to FIG. 3. FIG. 3 is a plan diagram schematically showing the structure of a Mach-Zehnder interferometer M. In FIG. 3, the Mach-Zehnder interferometer M is disposed with two optical waveguides $WG_1$ and $WG_2$. In the optical waveguide $WG_1$, there are disposed an input port $IN_1$ and an output port $OUT_1$. Similarly, in the optical waveguide $WG_2$, there are disposed an input port $IN_2$ and an output port $OUT_2$.

Additionally, on the side of the input ports $IN_1$ and $IN_2$, the optical waveguides $WG_1$ and $WG_2$ are arranged in parallel so as to be capable of optical coupling, and a directional coupler $HK_1$ is formed. Similarly, on the side of the output ports $OUT_1$ and $OUT_2$, the optical waveguides $WG_1$ and $WG_2$ are arranged in parallel so as to be capable of optical coupling, and a directional coupler $HK_2$ is formed.

Between these directional couplers $HK_1$ and $HK_2$, there is formed a bend waveguide section C that serves as a combination region of a bend region where the optical waveguides $WG_1$ and $WG_2$ are curved and a straight region.

Here, ΔL represents the optical path difference in the bend waveguide section C of the Mach-Zehnder interferometer M. This ΔL is given by (optical path length of optical waveguide $WG_1$)−(optical path length of optical waveguide $WG_2$). Further, light L whose wavelength in a vacuum is λ is input from the input port $IN_1$.

At this time, "outputted in a bar state" means that, in the directional couplers $HK_1$ and $HK_2$, the light L is outputted from the output port $OUT_1$ of the optical waveguide $WG_1$ without power transition of the light L to the optical waveguide $WG_2$ occurring.

Further, "outputted in a cross state" means that, in the directional couplers $HK_1$ and $HK_2$, the power of the light L transitions to the optical waveguide $WG_2$ and the light L is outputted from the output port $OUT_2$ of the optical waveguide $WG_2$.

It is known that whether the light L becomes a bar state or a cross state is determined by the relationship between the optical path difference ΔL in the bend waveguide section C and the wavelength λ of the light. That is, when the following expression (2) is satisfied, the light L becomes a cross state, and when the following expression (3) is satisfied, the light L becomes a bar state.

$$2\pi n \Delta L/\lambda = 2m\pi \quad (2)$$

$$2\pi n \Delta L/\lambda = (2m+1)\pi \quad (3)$$

Here, n is the refractive index of the optical waveguides $WG_1$ and $WG_2$. Further, m is a natural number.

Returning again to FIG. 1A, description will be performed regarding the optical path difference ΔL in the optical multiplexing/demultiplexing device 10. The optical multiplexing/demultiplexing device 10 performs multiplexing/demultiplexing of light utilizing the aforementioned property of a Mach-Zehnder interferometer.

That is, as shown in FIG. 1A, the optical path difference ΔL in the bend waveguide sections 18b to 24b is set such that a first light $L_1$ is outputted in a bar state and such that a second light $L_2$ is outputted in a cross state. Thus, the optical multiplexing/demultiplexing device 10 becomes capable of performing multiplexing/demultiplexing of the first light $L_1$ and the second light $L_2$.

Next, a method of designing the optical path difference in the bend waveguide sections 18b to 24b will be described listing actual numerical values.

Here, it will be assumed that the first light $L_1$ and the second light $L_2$ are lights of wavelengths that are usually used in an optical subscriber loop system. That is, it will be assumed that a wavelength $\lambda_{1V}$ of the first light $L_1$ in a vacuum is 1.3 μm and that a wavelength $\lambda_{2V}$ of the second light $L_2$ in a vacuum is 1.49 μm.

Further, $n_1$ (=2.53) represents the equivalent refractive index of the first and second optical waveguides 14 and 16 regarding the first light $L_1$, and $n_2$ (=2.25) represents the equivalent refractive index of the first and second optical waveguides 14 and 16 regarding the second light $L_2$.

When these values are assigned to expression (2) and expression (3) while keeping in mind that the first light $L_1$ is outputted in a bar state and that the second light $L_2$ is outputted in a cross state, the following expression (4) and expression (5) are respectively obtained.

$$2\pi n_2 \Delta L/\lambda_{2V} = 2\pi \Delta L/\lambda_2 = 2\pi \times 2.25 \, \Delta L/1.49 = 2\pi m \quad (4)$$

$$2\pi n_1 \Delta L/\lambda_{1V} = 2\pi \Delta L/\lambda_1 = 2\pi \times 2.53 \, \Delta L/1.3 = (2m+1)\pi \quad (5)$$

Here, $\lambda_1$ represents the wavelength of the first light $L_1$ in propagation through the first and second optical waveguides 14 and 16. Similarly, $\lambda_2$ represents the wavelength of the second light $L_2$ in propagation through the first and second optical waveguides 14 and 16.

When the difference between expression (4) and expression (5) is calculated, ΔL=1.15 μm is obtained.

When ΔL (=1.15) that has been determined in this manner is assigned to expression (4) to determine m, m=1.729. Incidentally, m has the condition that it is a natural number, and when this condition is not satisfied, the second light $L_2$ does not become a cross state. It is also possible to make m=2 precisely by the design of the waveguides, but in usual design, the value of m is made into 2, which is the closest natural number to 1.729 (m=2).

Because the value of m is determined by this, when m=2 is again assigned to expression (4) to determine ΔL, ΔL=1.32 μm. This is the final result.

In other words, by making the optical path difference ΔL in the bend waveguide sections 18b to 24b in the Mach-Zehnder interferometers 18 to 24 equal to 1.32 μm, the first light $L_1$ can be outputted in a bar state and the second light $L_2$ can be outputted in a cross state. Thus, wavelength division of the first light $L_1$ and the second light $L_2$ becomes possible.

(Regarding ΔL in the Case of a Si-Wire Waveguide)

In the section "(Regarding ΔL)", the most common case has been described regarding the method of calculating ΔL. However, in a case where the wavelength dispersion of the refractive index of the material that configures the optical waveguides $WG_1$ and $WG_2$ is large, it is possible to simultaneously establish the aforementioned expression (2) and expression (3) by optimizing the dimensions of the optical waveguides $WG_1$ and $WG_2$.

Here, as a material where the wavelength dispersion of the refractive index of the material that configures the optical waveguides $WG_1$ and $WG_2$ is large, for example, Si can be listed.

This point will be described in detail below.

As shown in FIG. 1A, $\Delta L$ is set such that the first light $L_1$ (wavelength $\lambda_{1V}$=1.3 μm) is outputted in a bar state and such that the second light $L_2$ (wavelength $\lambda_{2V}$=1.49 μm) is outputted in a cross state. Consequently, the aforementioned expression (2) and expression (3) can be written as the following expression (2)' and (3)'.

$$2\pi n_1 \Delta L/\lambda_{1V} = 2m\pi \qquad (2)'$$

$$2\pi n_2 \Delta L/\lambda_{2V} = (2m+1)\pi \qquad (3)'$$

Here, $n_1$ is the equivalent refractive index of an optical waveguide that the light of the wavelength $\lambda_{1V}$ experiences, and $n_2$ is the equivalent refractive index of an optical waveguide that the light of the wavelength $\lambda_{2V}$ experiences.

When $\Delta L$ that simultaneously satisfies expression (2)' and expression (3)' can be determined, the first light $L_1$ can be outputted in a bar state and the second light $L_2$ can be outputted in a cross state.

For that reason, $\Delta n = n_2 - n_1$ and $\Delta\lambda = \lambda_{2V} - \lambda_{1V}$ are substituted and these $\Delta n$ and $\Delta\lambda$ are used to determine $\Delta L$. First, when the difference between expression (2)' and expression (3)' is calculated and transformed, the following expression (14) is obtained.

$$2\Delta L = \lambda_{2V}(\lambda_{2V} - \Delta\lambda)/(\Delta\lambda n_2 + \lambda_{2V}\Delta n) \qquad (14)$$

In expression (14), the wavelength $\lambda_{2V}$ is made into a reference wavelength $\lambda_a$ that is to be emphasized in terms of design, and $n_a$ ($=n_2$) represents the equivalent refractive index of an optical waveguide that the light of the reference wavelength $\lambda_a$ experiences. Then, when expression (14) is assigned to expression (2)' and transformed, the following expression (15) is obtained.

$$\Delta n/n_a = (1 - \Delta\lambda/\lambda_a)/(2m) - \Delta\lambda/\lambda_a \qquad (15)$$

From expression (15), it will be understood that the design condition of $\Delta L$ is determined by the ratios $\Delta n/n_a$ and $\Delta\lambda/\lambda_a$. In other words, it suffices to find the integer m such that expression (15) is satisfied.

Incidentally, in expression (15), $\Delta\lambda$ and $\lambda_a$ become constants in a case where the wavelengths of the first light $L_1$ and the second light $L_2$ are already known. Thus, the only unknown amount in expression (15) is $\Delta n/n_a$.

Figure 10:
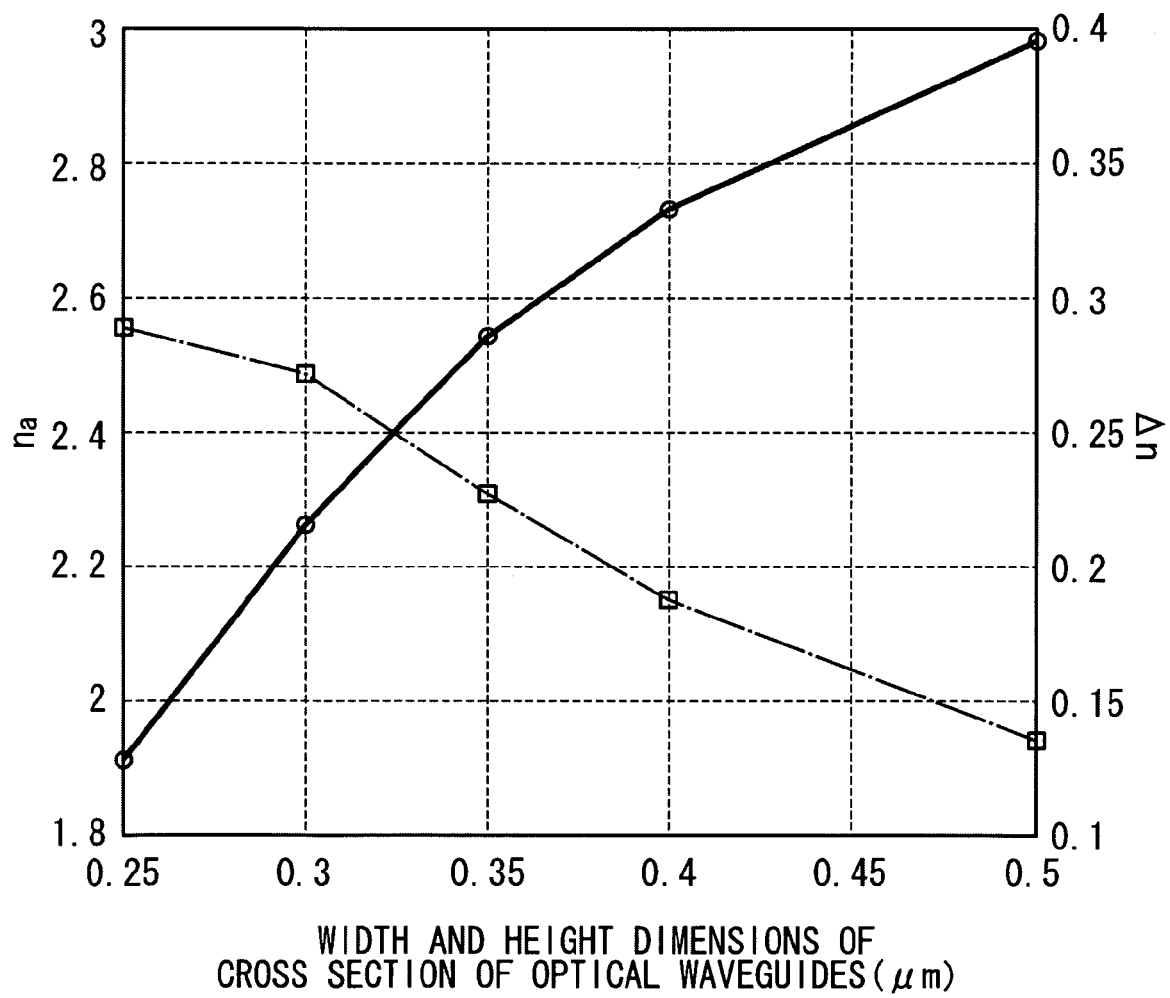
FIG. 10 is a simulation result for determining Δn and $n_a$.

$\Delta n$ and $n_a$ can be determined from a simulation. FIG. 10 shows this simulation result. In FIG. 10, the left vertical axis represents the equivalent refractive index $n_a$ (non-dimensional) of an optical waveguide that the light of the reference wavelength $\lambda_a$ experiences. The right vertical axis represents $\Delta n$ (non-dimensional). The horizontal axis represents the dimension (μm) of an optical waveguide cut in a plane orthogonal to the light propagation direction. It will be noted that, in this simulation, the cross-sectional shape of the optical waveguide orthogonal to the light propagation direction is square.

This simulation is one where the dimension of the optical waveguide was changed and where the equivalent refractive index $n_a$ of the optical waveguide that the light of the reference wavelength $\lambda_a$ (=1.49 μm) experiences and $\Delta n_a$ were calculated. From the result shown in FIG. 10, $\Delta n/n_a$ can be determined.

Figure 11:
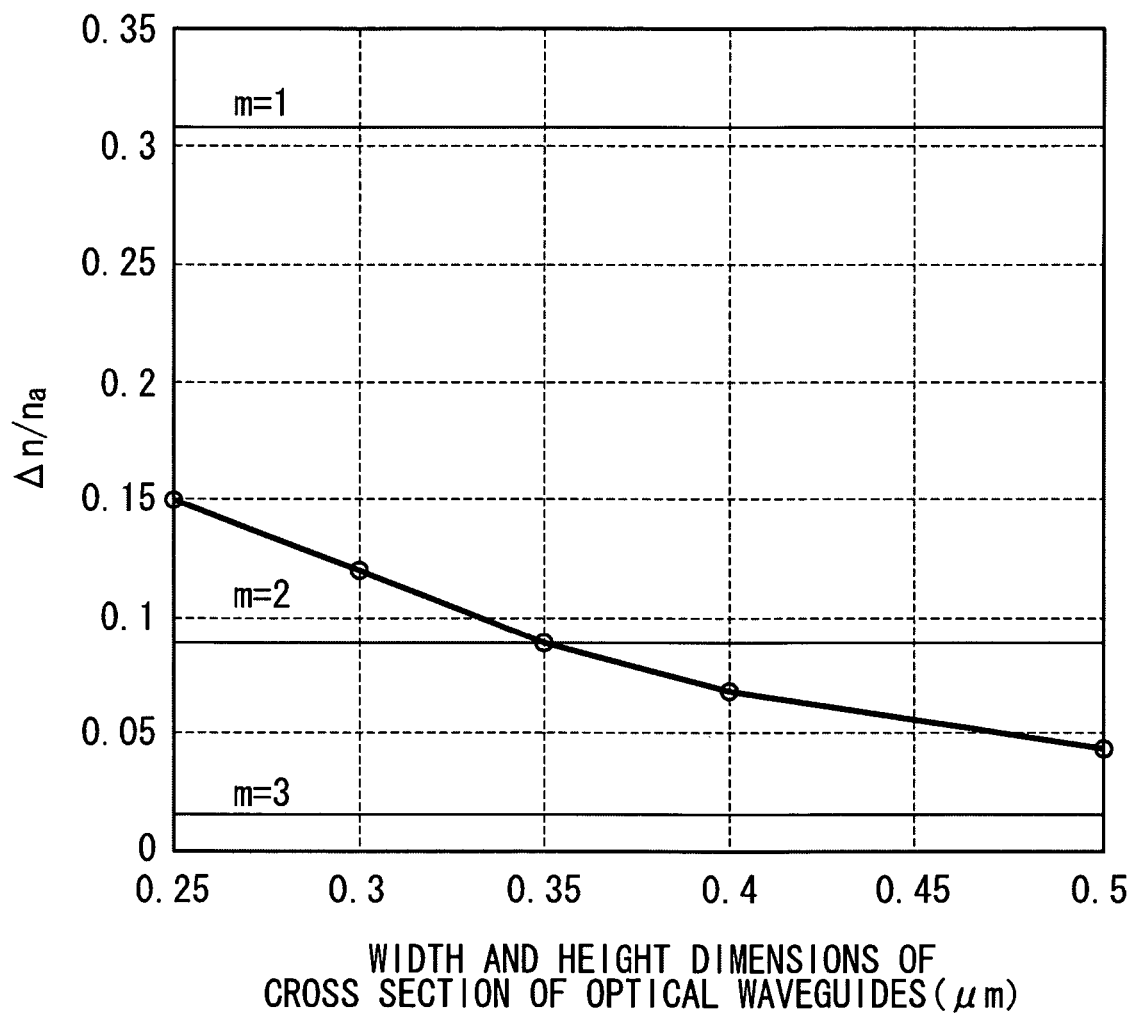
FIG. 11 is a characteristic diagram where expression (15) is graphed.

FIG. 11 is a characteristic diagram where expression (15) is graphed. In FIG. 11, the vertical axis is $\Delta n/n_a$ (non-dimensional), and the horizontal axis is the dimension of the optical waveguide. In FIG. 11 also, similar to FIG. 10, the cross-sectional shape of the optical waveguide is square.

In FIG. 11, three horizontal lines are shown, and these are values of $\Delta n/n_a$ that are obtained by respectively assigning the values of m=1, 2, 3 to expression (15). Further, the curve in FIG. 11 is values of $\Delta n/n_a$ that are obtained from FIG. 10.

Referring to FIG. 11, the horizontal line of m=2 and the curve of $\Delta n/n_a$ that is obtained from FIG. 10 intersect at the point where the dimension of the optical waveguide is about 0.35 μm and where $\Delta n/n_a$ is about 0.09. In other words, it will be understood that expression (15) is satisfied at this point.

Incidentally, when expression (14) is transformed, the following expression (16) is obtained.

$$2n_a\Delta L/\lambda_a = 2m = (1 - \Delta\lambda/\lambda_a)/(\Delta\lambda/\lambda_a + \Delta n/n_a) \qquad (16)$$

Thus, $\Delta L$ that can simultaneously satisfy expression (2)' and expression (3)' can be determined by assigning $\Delta n/n_a$ (=0.09) that has been obtained from FIG. 11 to expression (16) together with other known amounts. When calculation is actually performed using expression (16), $\Delta L$=1.17 μm is obtained.

In this manner, in a case where the wavelength dispersion of the refractive index of the material that configures the optical waveguides $WG_1$ and $WG_2$ is large, such as in the case of a Si-wire optical waveguide, $\Delta L$ that strictly satisfies expression (2) and expression (3) can be determined.

It will be noted that the above argument can also be applied to an optical multiplexing/demultiplexing device that performs multiplexing/demultiplexing of light of N wavelengths (where N is an integer equal to or greater than 3). Here, "multiplexing/demultiplexing light of N wavelengths" means outputting light of (N−i) wavelength (where i is an integer such that $1 \leq i \leq N-1$) in a cross state and outputting light of i wavelength in a bar state.

In this case, at both ends of the optical multiplexing/demultiplexing device, the difference in the order of interference of the wavelengths becomes larger than 1. Thus, in this case, expression (2)' and expression (3)' can be written in a more common way as in the following expression (17).

$$2\pi n_j \Delta L/\lambda_j = 2\pi(m + \Delta m) \qquad (17)$$

Here, $\lambda_j$ represents the wavelength of light that is to be multiplexed/demultiplexed and is arranged such that the wavelength becomes shorter the larger that j is (where j is an integer such that $1 \leq j \leq N$). Further, $n_j$ is the equivalent refractive index of an optical waveguide that the light whose wavelength is $\lambda_j$ experiences. $\Delta m$ is a value that is given by 2−N.

When calculation is performed using expression (17), the aforementioned expression (15) and expression (16) can be respectively transformed into the following expression (15)' and expression (16)' in the case of N wavelengths.

$$\Delta n/n_a = \Delta m(1 - \Delta\lambda/\lambda_a)/(2m) - \Delta\lambda/\lambda_a \qquad (15)'$$

$$2n_a\Delta L/\lambda_a = 2m = \Delta m(1 - \Delta\lambda/\lambda_a)/(\Delta\lambda/\lambda_a + \Delta n/n_a) \qquad (16)'$$

Thus, by the same argument as mentioned above, the value of $\Delta L$ that enables the multiplexing/demultiplexing of light of N wavelengths can be determined from expression (15)' and expression (16)' in a case where the wavelength dispersion of the refractive index of the material that configures the optical waveguides $WG_1$ and $WG_2$ is large.

(Design of the Bend Waveguides that Achieves $\Delta L$)

Referring to FIG. 4A, a method of designing the first and second optical waveguides 14 and 16 for achieving the aforementioned optical path difference ΔL in the bend waveguide sections 18b to 24b will be described. FIG. 4A is an enlarged plan diagram of relevant portions of a bend waveguide section. It will be noted that, because the shapes of the bend waveguide sections 18b to 24b are the same, in the following description, description will be performed using the bend waveguide section 22b as an example.

The bend waveguide section 22b is designed connecting straight waveguides, that is, straight regions, and curve waveguides, that is, bend regions, that have uniform radii of curvature.

Figure 4:
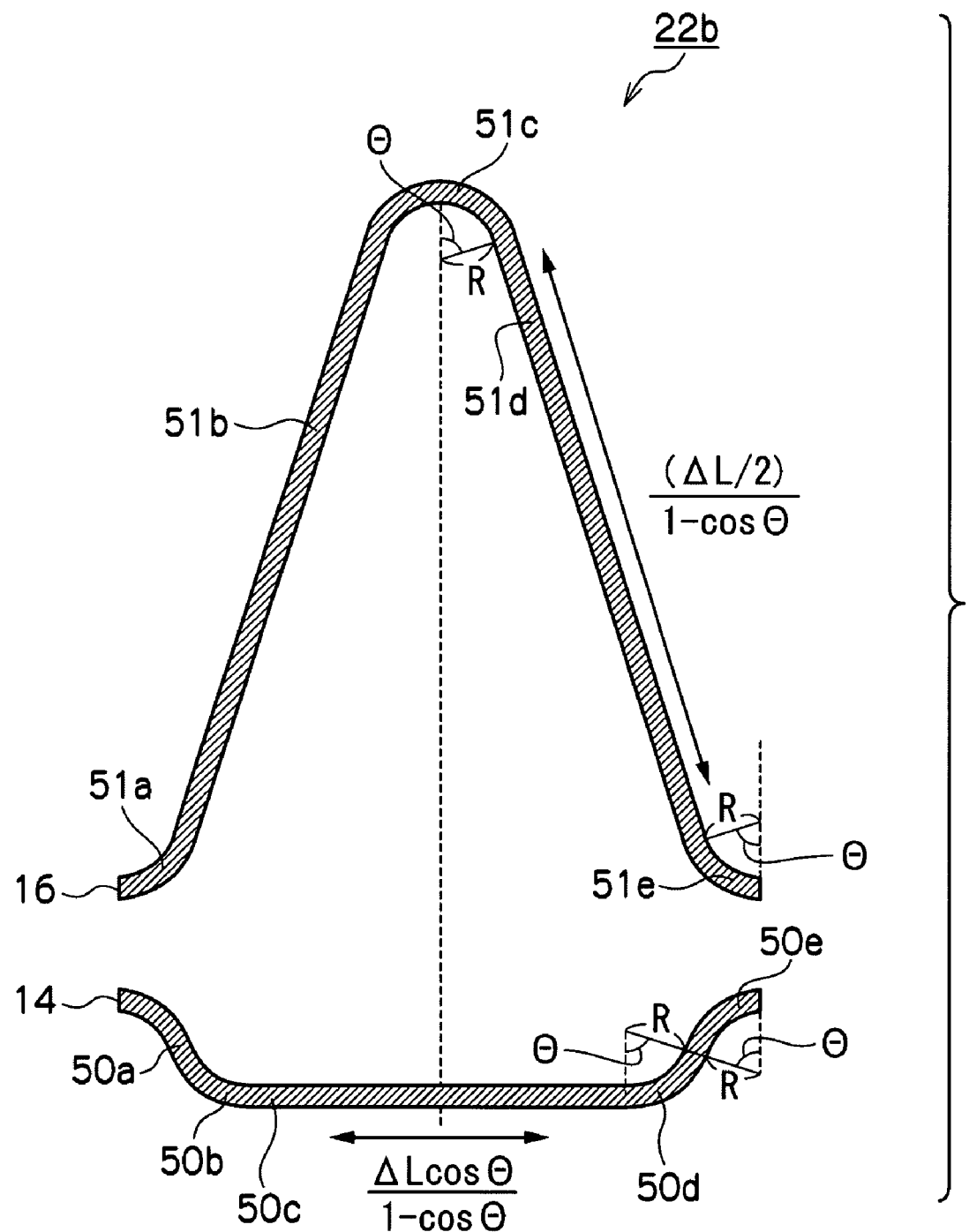
FIG. 4 is an enlarged plan diagram of relevant portions of a bend waveguide section.

That is, as shown in FIG. 4, the first optical waveguide 14 in the bend waveguide section 22b is configured in the order of a curve waveguide 50a, a curve waveguide 50b, a straight waveguide 50c, a curve waveguide 50d and a curve waveguide 50e from the side of the first optical input/output port 14a.

Here, in the curve waveguides 50a, 50b, 50d and 50e, a radius of curvature R and an arc slope angle θ are equal. Further, the length of the straight waveguide 50c is geometrically determined as $\Delta L \cos \theta / (1 - \cos \theta)$ using the arc slope angle θ and the optical path difference ΔL between the first and second optical waveguides 14 and 16 in the bend waveguide section 22b.

Similarly, the second optical waveguide 16 in the bend waveguide section 22b is configured in the order of a curve waveguide 51a, a straight waveguide 51b, a curve waveguide 51c, a straight waveguide 51d and a curve waveguide 51e from the side of the first optical input/output port 16a.

Here, in the curve waveguides 51a and 51e, the radius of curvature R and the arc slope angle θ are equal. Further, the radius of curvature of the curve waveguide 51c is R and the arc slope angle is 2θ. It will be noted that R and θ in the aforementioned first optical waveguide 14 and R and θ in the second optical waveguide 16 are respectively the same values.

Further, the lengths of the straight waveguides 51b and 51d are geometrically determined as $(\Delta L/2)/(1 - \cos \theta)$ using the arc slope angle θ and the optical path difference ΔL between the first and second optical waveguides 14 and 16 in the bend waveguide section 22b.

In order to determine R and θ in the bend waveguide section 22b of this structure, there will be considered a condition where intensity loss of light that propagates through the bend waveguide section 22b becomes a minimum.

Here, $\alpha_R$ represents intensity loss of light per unit length in the curve waveguides 50a, 50b, 50d, 50e, 51a, 51c and 51e. Further, $\alpha_S$ represents intensity loss of light per unit length of the straight waveguides 50c, 51b and 51d.

Moreover, $\alpha_{JRS}$ represents intensity loss of light at the joint portion between the curve waveguide 50b and the straight waveguide 50c, the joint portion between the straight waveguide 50c and the curve waveguide 50d, the joint portion between the curve waveguide 51a and the straight waveguide 51b, the joint portion between the straight waveguide 51b and the curve waveguide 51c, the joint portion between the curve waveguide 51c and the straight waveguide 51d, and the joint portion between the straight waveguide 51d and the curve waveguide 51e.

Further, $\alpha_{JRR}$ represents intensity loss of light at the joint portion between the curve waveguides 50a and 50b and the joint portion between the curve waveguides 50d and 50e.

At this time, a sum $\alpha_{14}L_{14}$ of intensity loss of light of the first optical waveguide 14 in the bend waveguide section 22b is given by the following expression (6). It will be noted that, here, $L_{14}$ represents the total length of the first optical waveguide 14 in the bend waveguide section 22b, and $\alpha_{14}$ represents intensity loss per unit length of the first optical waveguide 14 in the bend waveguide section 22b.

$$\alpha_{14}L_{14} = \alpha_R 4R\theta + (\alpha_S \Delta L \cos \theta)/(1 - \cos \theta) + 2\alpha_{JRS} + 2\alpha_{JRR} \quad (6)$$

Further, a sum $\alpha_{16}L_{16}$ of intensity loss of light of the second optical waveguide 16 in the bend waveguide section 22b is given by the following expression (7). It will be noted that, here, $L_{16}$ represents the total length of the second optical waveguide 16 in the bend waveguide section 22b, and $\alpha_{16}$ represents intensity loss per unit length of the second optical waveguide 16 in the bend waveguide section 22b.

$$\alpha_{16}L_{16} = \alpha_R 4R\theta + (\alpha_S \Delta L)/(1 - \cos \theta) + 4\alpha_{JRS} \quad (7)$$

It is known that, usually, intensity loss of light in the curve waveguides 50a, 50b, 50d, 50e, 51a, 51c and 51e becomes larger the smaller that the radius of curvature R becomes. Consequently, from expression (6) and expression (7), it is suggested that there exists θ where intensity loss of light becomes a minimum.

Thus, in the bend waveguide section 22b, a condition that minimizes intensity loss of light regarding the second optical waveguide 16 is determined from expression (7). It will be noted that the reason that the condition of minimizing intensity loss of light is determined regarding the second optical waveguide 16 rather than the first optical waveguide 14 is because the optical path length of the second optical waveguide 16 is longer than the optical path length of the first optical waveguide 14 and, consequently, intensity loss of light is larger in the second optical waveguide 16 than in the first optical waveguide 14.

That is, the following expression (8) is obtained as a conditional expression that minimizes intensity loss of light by differentiating expression (7) by θ.

$$d(\alpha_{16}L_{16})/d(\theta) = \alpha_R 4R - (\alpha_S \Delta L \sin \theta)/(1 - \cos \theta)^2 = 0 \quad (8)$$

When expression (8) is transformed, the following expression (9) is obtained.

$$R/\Delta L = (\alpha_S / \alpha_R) \times \sin \theta / \{4(1 - \cos \theta)^2\} \quad (9)$$

As will be understood from expression (9), the condition that minimizes intensity loss of light becomes a relationship between θ and a standardized radius of curvature R/ΔL.

Figure 5:
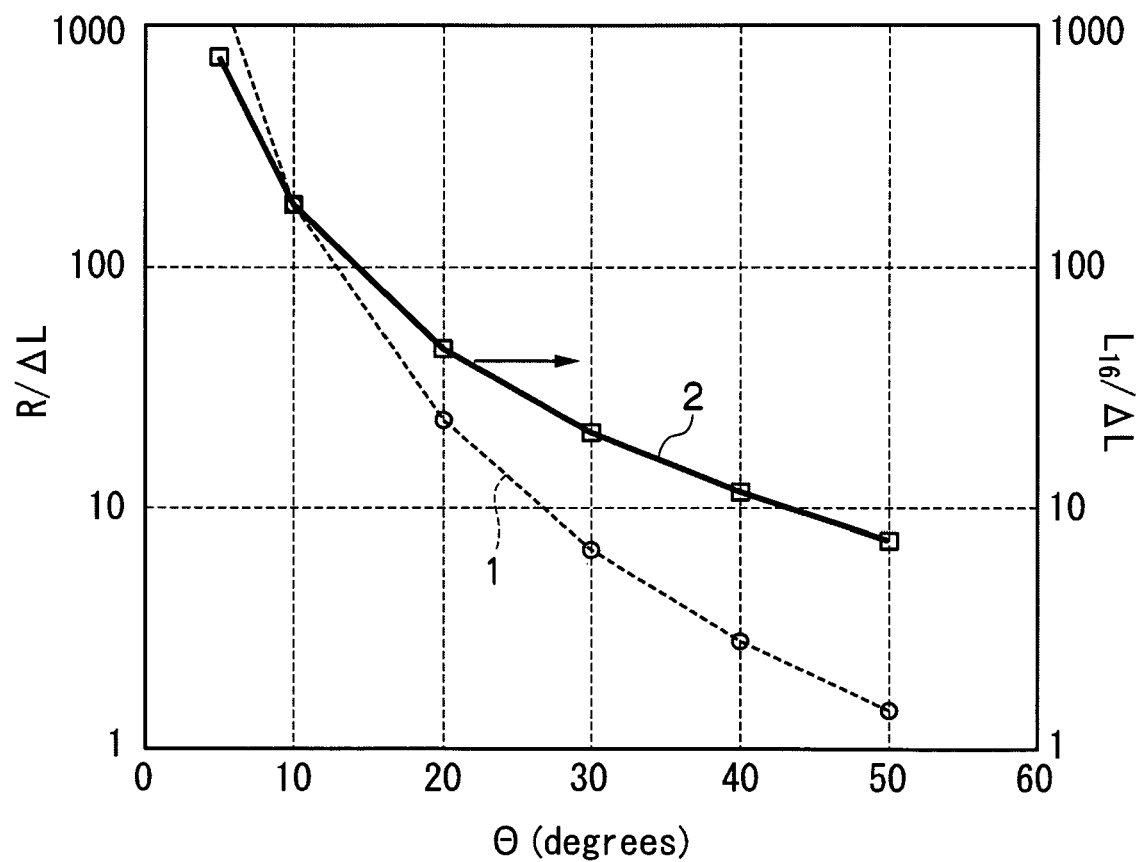
FIG. 5 is a diagram showing the relationship between R/ΔL and θ and the relationship between $L_{16}$/ΔL and θ.

FIG. 5 shows, regarding a case where $\alpha_S/\alpha_R = 1$, the relationship (curve 1) between θ and R/ΔL of expression (9) and the relationship (curve 2) between θ and the total length $L_{16}/\Delta L$ of the standardized second optical waveguide 16 that has been determined assigning the value of R/ΔL that has been obtained from this relationship to expression (7).

In FIG. 5, the left vertical axis represents R/ΔL (non-dimensional), and the right vertical axis represents $L_{16}/\Delta L$ (non-dimensional). The horizontal axis represents θ (degrees).

Incidentally, as is conventionally known, a practical radius of curvature R, where intensity loss $\alpha_R$ of light per unit length in a curve waveguide and intensity loss $\alpha_S$ of light per unit length in a straight waveguide become substantially equal, is equal to or greater than 5 μm.

Thus, when R/ΔL is determined using 5 μm as R and using ΔL (=1.32 μm) that has been determined in the section "(Regarding ΔL)" and this is applied to curve 1 of FIG. 5, θ that can minimize intensity loss $\alpha_{16}L_{16}$ of light is determined to be about 30°.

Further, when θ=30° and ΔL=1.32 μm are applied to curve 2 of FIG. 5, the total length $L_{16}$ of the second waveguide 16 that minimizes intensity loss $\alpha_{16}L_{16}$ of light is determined to be about 26 μm.

In order words, even when the lengths of the directional coupler sections 18a to 24a are taken into consideration, the total length of the optical multiplexing/demultiplexing device 10 can be controlled to about 200 μm.

(Regarding the Widths of the Optical Waveguides in the Directional Coupler Sections and the Bend Waveguide Sections)

In the section "(Structure of the Mach-Zehnder Interferometers)", the width W2 of the optical waveguides in the directional coupler sections 18a to 24a was described as being slightly smaller than the width W1 of the optical waveguides in the bend waveguide sections 18b to 24b. The reason for this is to make the optical multiplexing/demultiplexing device 10 polarization-independent.

It is known that, in order to ensure that polarization dependence does not arise in the bend waveguide sections 18b to 24b that are configured as channel type waveguides, it is good for the transverse cross-sectional shapes (shapes of cut surface perpendicular to the light propagation. direction) of the first and second optical waveguides 14 and 16 to be square.

Based on this, the transverse cross-sectional shapes of the first and second optical waveguides 14 and 16 that configure the bend waveguide sections 18b to 24b are made into squares of, preferably for example, 0.3 μm×0.3 μm.

By designing the dimension of the transverse cross-sectional shapes of the bend waveguide sections 18b to 24b in this manner, in the bend waveguide sections 18b to 24b, the first and second optical waveguides 14 and 16 become polarization-independent and function as single mode waveguides with respect to the first light $L_1$ and the second light $L_2$.

In order to make the directional coupler sections 18a to 24a polarization-independent, it is necessary to adjust the transverse cross-sectional shapes of the first and second optical waveguides 14 and 16 and the coupling lengths (lengths along the light propagation direction) of the directional coupler sections 18a to 24a.

More specifically, the inventors performed a simulation changing the coupling lengths and the widths of the first and second optical waveguides 14 and 16 regarding the second light $L_2$ of the wavelength $\lambda_{2V}$ (=1.49 μm) and determined a coupling length and a waveguide width where the directional coupler sections 18a to 24a become polarization-independent.

Figure 6A:
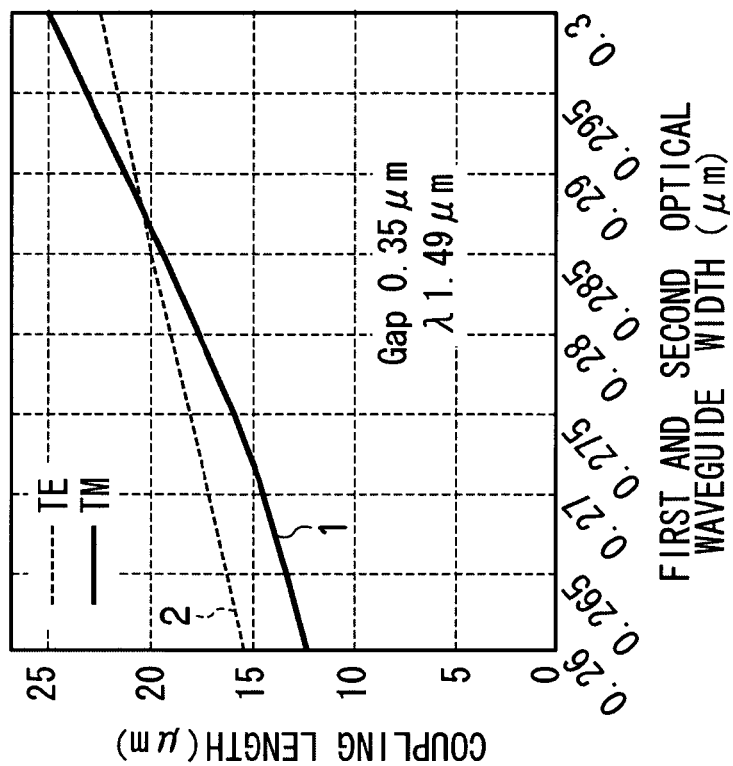
FIG. 6A is a simulation result showing the relationship between coupling lengths and first and second optical waveguide widths for making directional coupler sections polarization-independent.
Figure 6B:
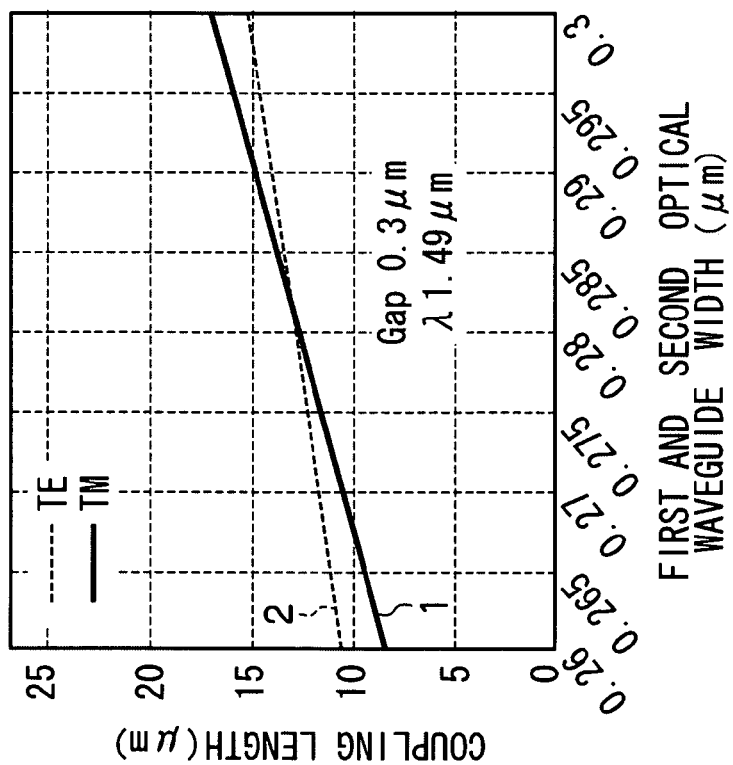
FIG. 6B is a simulation result showing the relationship between coupling lengths and first and second optical waveguide widths for making directional coupler sections polarization-independent.

FIG. 6A and FIG. 6B show that simulation result. In both FIG. 6A and FIG. 6B, the vertical axis represents the coupling length (μm) and the horizontal axis represents the width (μm) of the first and second optical waveguides 14 and 16.

Further, FIG. 6A shows a case where the gap between the first and second optical waveguides 14 and 16 is 0.3 μm, and FIG. 6B shows a case where the gap between the first-and second optical waveguides 14 and 16 is 0.35 μm.

Further, in FIG. 6A and FIG. 6B, curve 1 indicated by the solid line represents the relationship between waveguide width and coupling length relating to TE polarization, and curve 2 indicated by the chain line represents the relationship between waveguide width and coupling length relating to TM polarization.

It will be noted that, in both FIG. 6A and FIG. 6B, the simulation was performed with a height H of the first and second optical waveguides 14 and 16 being, similar to the bend waveguide sections 18b to 24b, 0.3 μm.

Referring to FIG. 6A, it will be understood that, in the directional coupler sections 18a to 24a, when the gap between the first and second optical waveguides 14 and 16 is 0.3 μm, curves 1 and 2 intersect at the point where the coupling length (vertical axis) is about 13 μm and where the waveguide width (horizontal axis) is about 0.28 μm.

Further, referring to FIG. 6B, it will be understood that, in the directional coupler sections 18a to 24a, when the gap between the first and second optical waveguides 14 and 16 is 0.35 μm, curves 1 and 2 intersect at the point where the coupling length (vertical axis) is about 21 μm and where the waveguide width (horizontal axis) is about 0.287 μm.

This means that the directional coupler sections 18a to 24a become polarization-independent at these points of intersection between curve 1 and curve 2. However, when FIG. 6A and FIG. 6B are compared with each other, it will be understood that polarization dependence is smaller when the gap between the first and second optical waveguides 14 and 16 is 0.3 μm than when the gap between the first and second optical waveguides 14 and 16 is 0.35 μm because the inclinations of both curve 1 and curve 2 are more gradual in FIG. 6A than in FIG. 6B.

Thus, when dimensional error at the time of manufacture of the directional coupler sections 18a to 24a is taken into consideration, even when the dimension is off somewhat, FIG. 6A, where there is little shift from the optimum condition (where the gap is 0.3 μm), is more advantageous in terms of design.

It will be noted that the reason that design of the directional coupler sections 18a to 24a was performed focusing on the second light $L_2$ of the wavelength $\lambda_{2V}$ in this simulation will be described below.

When the first and second optical waveguides 14 and 16 are formed by single crystal silicon, in comparison to when they are formed by quartz, in the wavelength range (1.3 to 1.49 μm) used in an ONU, the wavelength dependence of the directional coupler sections 18a to 24a is large, and a difference of about 4 times arises in the coupling length. In other words, coupling is extremely weak in the first light $L_1$ of the wavelength $\lambda_{1V}$ (1.3 μm) in comparison to the second light $L_2$ of the wavelength $\lambda_{2V}$ (1.49 μm).

Thus, it is advantageous in terms of design for the first light $L_1$, whose coupling is weak, to be outputted in a bar state. When designed in this manner, it is necessary for the second light $L_2$ to be outputted in a cross state. Incidentally, it is known that, usually, in a Mach-Zehnder interferometer, it is necessary to strictly design the coupling length in order to output a cross state with a good extinction ratio. On the other hand, it is known that a bar state is outputted with a good extinction ratio even when the coupling length is not strictly designed.

This is the reason why design of the directional coupler sections 18a to 24a was performed only in regard to the second light $L_2$.

(Operation)

Referring again to FIG. 1A, operation of the optical multiplexing/demultiplexing device 10 of this exemplary embodiment will be described.

First, a case will be considered where the first light $L_1$ (wavelength $\lambda_{1V}$=1.3 μm) and the second light $L_2$ (wavelength $\lambda_{2V}$=1.49 μm) are input to the optical multiplexing/demultiplexing device 10 from the first optical input/output port 14a.

In this case, the first light $L_1$ is outputted in a bar state, that is, from the second optical input/output port 14b. On the other hand, the second light $L_2$ is, as mentioned above, outputted in a cross state, that is, from the second optical input/output port 16b.

In a case where the optical multiplexing/demultiplexing device 10 is used as an ONU, the first light $L_1$ is an uplink signal from the subscriber loop to the station and the second light $L_2$ is a downlink signal from the station to the subscriber loop.

In this case, the first light $L_1$ (uplink signal) that has been input from the second optical input/output port 14b is outputted from the first optical input/output port 14a in a bar state. Further, the second light $L_2$ (downlink signal) that has been input from the first optical input/output port 14a is outputted from the second optical input/output port 16b in a cross state.

Next, referring to FIG. 7, operating characteristics of the optical multiplexing/demultiplexing device 10 of this exemplary embodiment will be described. FIG. 7 is a simulation result of the operating characteristics. The vertical axis represents the ratio (non-dimensional) of output intensity with respect to input intensity of the bar state and the cross state, and the horizontal axis represents the wavelength of light that has been input to the optical multiplexing/demultiplexing device 10. Further, in FIG. 7, curve 1 indicated by the solid line represents the bar state, and curve 2 indicated by the chain line indicates the cross state.

The optical multiplexing/demultiplexing device 10 that was used in the simulation was, except for the following points, designed with the dimensions that have been described in the sections "(Structure)" to "(Regarding the Widths of the Optical Waveguides in the Directional Coupler Sections and the Bend Waveguide Sections)".

(1) Micro-adjustment of Coupling Length of Directional Coupler Sections 18a to 24a In the vicinities of the joint portions between the directional coupler sections 18a to 24a and the bend waveguide sections 18b to 24b, the first and second optical waveguides 14 and 16 that configure the bend waveguides 18b to 24b end up approaching each other as far as a distance where they are capable of optical coupling. For that reason, the coupling length of the directional coupler sections 18a to 24a was adjusted to a short 11.6 µm.

(2) The optical path difference ΔL between the first and second optical waveguides 14 and 16 in the bend waveguide sections 18b to 24b was made into 1.344 µm.

This is because, taking into consideration the, equivalent refractive index of the first and second optical waveguides 14 and 16 that are made of single crystal silicon, the optical path difference ΔL was adjusted such that the first light $L_1$ (wavelength $\lambda_{1V}$=1.3 µm) and the second light $L_2$ (wavelength $\lambda_{2V}$=1.49 µm) respectively become center wavelengths in the bar state and the cross state.

Referring to FIG. 7, it will be understood that, in both the bar state in the vicinity of wavelength 1.3 µm and the cross state in the vicinity of 1.49 µm, wavelength division is performed in a broad wavelength range. The wavelength band for which wavelength division is completely performed is about 50 nm, and it is possible to completely absorb wavelength fluctuation of the light source and manufacturing error of the optical multiplexing/demultiplexing device 10.

Further, output light of an intensity that is substantially equal to the intensity of the input light can be obtained.

(Effects)

(1) The optical multiplexing/demultiplexing device 10 of this exemplary embodiment can, as shown in FIG. 7, perform multiplexing/demultiplexing of the first light $L_1$ and the second light $L_2$ virtually without causing crosstalk.

(2) Further, as shown in FIG. 7, the optical multiplexing/demultiplexing device 10 of this exemplary embodiment can reduce loss of light intensity in comparison to convention.

(3) Further, the optical multiplexing/demultiplexing device 10 has a total length of about 200 µm and is compact in comparison to a conventional Si-made Mach-Zehnder type of ONU.

(Design Conditions, Modifications, Etc.)

(1) In this exemplary embodiment, a case has been described where the four Mach-Zehnder interferometers 18 to 24 were connected in series. However, the number of the Mach-Zehnder interferometers that configure the optical multiplexing/demultiplexing device 10 is not limited to four.

As long as the optical multiplexing-demultiplexing device 10 is disposed with one or more each of the bar state pair and the cross state pair, there is no limitation on the number of those Mach-Zehnder interferometers. For example, as shown in FIG. 8A, the number of the Mach-Zehnder interferometers may also be three. In this case, one each of the bar state pair and the cross state pair are disposed.

Further, as shown in FIG. 8B, the number of the Mach-Zehnder interferometers may also be six. In this case, three of the bar state pairs and two of the cross state pairs are disposed.

(2) In this exemplary embodiment, a case has been described where, at the boundary portions between the bend waveguide sections 18b to 24b and the directional coupler sections 18a to 24a, the widths of the first and second optical waveguides 14 and 16,were changed discontinuously from W1 to W2. In this design also, intensity loss of light can be controlled at a practically sufficient level. However, in order to reduce intensity loss of loss even more, it is preferred that the widths of the first and second optical waveguides 14 and 16 are changed smoothly in a tapered manner at the boundary portions.

(3) As described in the section "(Design of the Bend Waveguides that Achieves ΔL)", in this exemplary embodiment, the bend waveguide sections 18b to 24b of the Mach-Zehnder interferometers 18 to 24 were formed by straight waveguides and curve waveguides that have uniform radii of curvature.

However, the bend waveguide sections 18b to 24b may also be designed combining curve waveguides with different radii of curvature.

Figure 9:
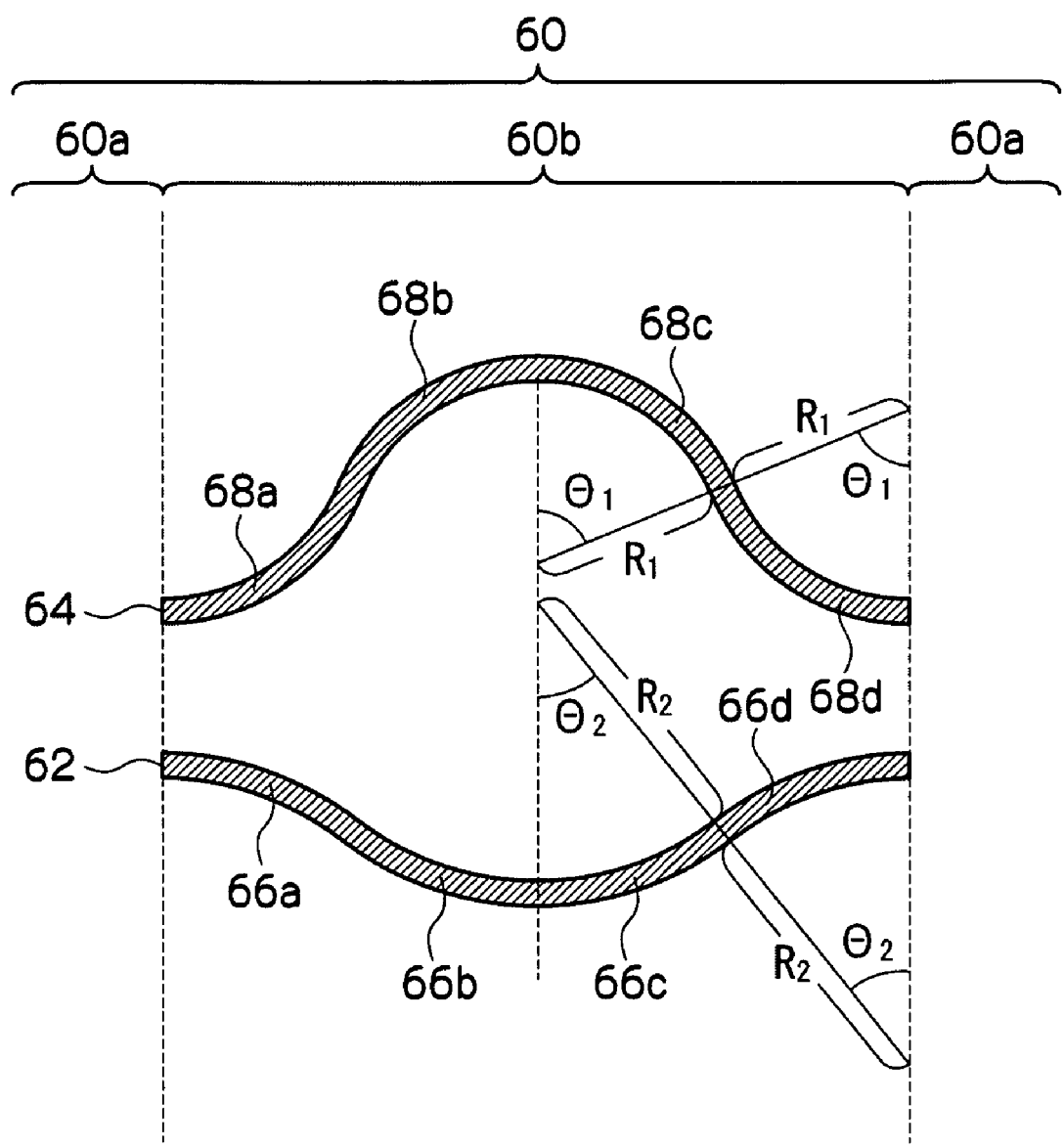
FIG. 9 is a diagram provided for describing a modification of the optical multiplexing/demultiplexing device.

More specifically, a bend waveguide section 60b of a Mach-Zehnder interferometer 60 that configures the optical multiplexing/demultiplexing device 10 may also be designed as shown in FIG. 9.

That is, this Mach-Zehnder interferometer 60 is configured by a first optical waveguide 62 and a second optical waveguide 64. Additionally, directional coupler sections 60a and 60a and the bend waveguide section 60b are formed by these first and second optical waveguides 62 and 64.

The first optical waveguide 62 in the bend waveguide section 60b is configured in the order of a curve waveguide 66a, a curve waveguide 66b, a curve waveguide 66c and a curve waveguide 66d.

Here, in the curve waveguides 66a to 66d, a radius of curvature $R_2$ and an arc slope angle $\theta_2$ are equal.

The second optical waveguide 64 in the bend waveguide section 60b is configured in the order of a curve waveguide 68a, a curve waveguide 68b, a curve waveguide 68c and a curve waveguide 68d.

Here, in the curve waveguides 68a to 68d, a radius of curvature $R_1$ ($\neq R_2$) and an arc slope angle $\theta_1$ ($\neq \theta_2$) are equal.

In this bend waveguide section 60b, the method of designing the first and second optical waveguides 62 and 64 for achieving the optical path difference ΔL conforms to the method that has been described in "(Design of the Bend Waveguides that Achieves ΔL)".

That is, regarding the second optical waveguide 64 whose optical path length is long, intensity loss $\alpha_{64}L_{64}$ of light in the bend waveguide section 60b is considered. Here, $L_{64}$ represents the total length of the second optical waveguide 64 in the bend waveguide section 60b, and $\alpha_{64}$ represents intensity loss per unit length of the second optical waveguide 64 in the bend waveguide section 60b. This intensity loss $\alpha_{64}L_{64}$ is given by the following expression (10).

$$\alpha_{64}L_{64} = \alpha_{R1}4R_1\theta_1 = \alpha_{R1}\{\Delta L + 4R_2 \sin^{-1}(R_1 \sin\theta_1/R_2)\} + 4\alpha_{JRR} \quad (10)$$

Here, $\alpha_{R1}$ represents intensity loss of light per unit length in the curve waveguide sections 68a to 68d. Further, $\alpha_{JRR}$ represents intensity loss of light in the joint portion between the curve waveguides 68a and 68b, the joint portion between the curve waveguides 68b and 68c, and the joint portion between the curve waveguides 68c and 68d.

From FIG. 9, it will be understood that, when $R_2$ is made infinite, the optical path difference $\Delta L$ is efficiently obtained. Thus, in expression (10), by making $R_2$ infinite, the following expression (11) is obtained.

$$\alpha_{64}L_{64} = \alpha_{R1}(\Delta L + 4R_1 \sin\theta_1) + 4\alpha_{JRR} \quad (11)$$

Incidentally, in the bend waveguide section 60b, the lengths at which the first and second optical waveguides 62 and 64 are projected on the central axis of the Mach-Zehnder interferometer must be equal, so the following expression (12) is obtained.

$$R_1 = \Delta L/\{4(\theta_1 - \sin\theta_1)\} \quad (12)$$

When expression (12) is assigned to expression (11), the following expression (13) is obtained as a final result.

$$\alpha_{64}L_{64} = \alpha_{R1}\Delta L\{\theta_1/(\theta_1 - \sin\theta_1)\} + 4\alpha_{JRR} \quad (13)$$

From expression (13), it will be understood that the intensity loss $\alpha_{64}L_{64}$ of light changes with respect to the arc slope angle $\theta_1$. Further, it will be understood that it is preferred that the arc slope angle $\theta_1$ is large and that the intensity loss $\alpha_{64}L_{64}$ of light becomes the smallest when $\theta_1 = \pi/2$.

What is claimed is:

1. An optical multiplexing/demultiplexing device comprising:
   a substrate; and
   first and second optical waveguides that are arranged in parallel and formed on the substrate, with one end of each of the first and second optical waveguides being configured as a first optical input/output port and the other end of each of the first and second optical waveguides being configured as a second optical input/output port,
   wherein
   the first and second optical waveguides between the first and second optical input/output ports include three or more Mach-Zehnder interferometers in series,
   multiplexed light comprising at least first light and second light whose wavelengths are different and which is input to either one of the first optical input/output ports is separated by wavelength and outputted from each of the second optical input/output ports of the first and second optical waveguides,
   the absolute value of an optical path difference $\Delta L$ with respect to light that propagates through the first and second optical waveguides in each of the Mach-Zehnder interferometers is constant, and
   the three or more Mach-Zehnder interferometers include at least one pair of successive Mach-Zehnder interferometers where the sum of optical path differences of the two interferometers becomes $+2\Delta L$ or $-2\Delta L$ and at least one pair of successive Mach-Zehnder interferometers where the sum of optical path differences of the two interferometers becomes 0.

2. The optical multiplexing/demultiplexing device of claim 1, wherein when $\lambda_1$ and $\lambda_2$ ($\lambda_2 > \lambda_1$) respectively represent the wavelengths of the first light and the second light inside the first and second optical waveguides, the optical path difference $\Delta L$ is given by the following expressions $$\Delta L = (2m+1) \times \lambda_1 \text{ and } \Delta L = 2m \times \lambda_2 \text{ (where m is a natural number)}.$$

3. The optical multiplexing/demultiplexing device of claim 2, wherein the first light is outputted in a bar state from one of the second optical input/output ports and the second light is outputted in a cross state from the other of the second optical input/output ports.

4. The optical multiplexing/demultiplexing device of claim 1, wherein the first and second optical waveguides are formed using Si as a material.

5. The optical multiplexing/demultiplexing device of claim 1, wherein
   cross-sectional shapes, orthogonal to the light propagation direction, of the first and second optical waveguides that form bend waveguide sections of the Mach-Zehnder interferometers are substantially square, and
   cross-sectional shapes, orthogonal to the light propagation direction, of the first and second optical waveguides that form directional coupler sections of the Mach-Zehnder interferometers are substantially rectangular where the length in a direction perpendicular to a main surface of the substrate is longer than the length in a direction parallel to the main surface of the substrate.

6. The optical multiplexing/demultiplexing device of claim 5, wherein the bend waveguide sections are formed by a straight waveguide and by a plurality of curved waveguides whose radii of curvature are equal.

7. The optical multiplexing/demultiplexing device of claim 2, wherein the optical path difference $\Delta L$ is determined utilizing the wavelength dependence of the equivalent refractive index of the material that forms the first and second optical waveguides.

8. The optical multiplexing/demultiplexing device of claim 7, wherein the material that forms the first and second optical waveguides is Si.

9. The optical multiplexing/demultiplexing device of claim 7, wherein when $\Delta\lambda$ represents the wavelength difference between the first light and the second light, $\Delta n$ represents the equivalent refractive index difference between the first and second optical waveguides that the first light and the second light experience, and m is a positive integer, the following expression is satisfied $$\Delta n/n_2 = (1 - \Delta\lambda/\lambda_2)/(2m) - \Delta\lambda/\lambda_2$$

and the optical path difference $\Delta L$ satisfies the following expression $$2n_2 \Delta L/\lambda_2 = (1 - \Delta\lambda/\lambda_2)/(\Delta\lambda/\lambda_2 + \Delta n/n_2)$$

where $n_2$ is the equivalent refractive index of an optical waveguide that the second light experiences.

10. An optical multiplexing/demultiplexing device comprising:
    a substrate; and
    first and second optical waveguides that are arranged in parallel and formed on the substrate, with one end of each of the first and second optical waveguides being configured as a first optical input/output port and the other end of each of the first and second optical waveguides being configured as a second optical input/output port, wherein the first and second optical waveguides between the first and second optical input/output ports include three or more Mach-Zehnder interferometers in series, multiplexed light of N wavelengths (where N is an integer such that N≧3) whose wavelengths are different and which is input to either one of the first optical input/output ports is separated by wavelength and outputted as light of (N−i) wavelength (where i is an integer such that 1≦i≦N−1) from the second optical input/output port of the first optical waveguide, and light of i wavelength is outputted from the second optical input/output port of the second optical waveguide, when m is, an integer equal to or greater than 1, the absolute value of an optical path difference ΔL with respect to light that propagates through the first and second optical waveguides in each of the Mach-Zehnder interferometers is constant, the three or more Mach-Zehnder interferometers include at least one pair of successive Mach-Zehnder interferometers where the sum of optical path differences of the two interferometers becomes $+2\Delta L$ or $-2\Delta L$ and at least one pair of successive Mach-Zehnder interferometers where the sum of optical path differences of the two interferometers becomes 0, and $$\Delta n/n_a = \Delta m(1-\Delta\lambda/\lambda_a)/(2m) - \Delta\lambda/\lambda_a \text{ and}$$

$$2n_a\Delta L/\lambda_a = 2m = \Delta m(1-\Delta\lambda/\lambda_a)/(\Delta\lambda/\lambda_a + \Delta n/n_a)$$

are simultaneously satisfied, where $\Delta m$ is an integer that is given by $2-N$, $\lambda_a$ is a reference wavelength, and $n_a$ is the equivalent refractive index of an optical waveguide that light of the reference wavelength experiences.

* * * * *